United States Patent [19]

Bach

[11] 4,324,267

[45] Apr. 13, 1982

[54] FLUID PRESSURE BALANCING AND MIXING VALVE

[76] Inventor: Huynh Thien Bach, 5775 Ch. Côte des Neiqes, app. 203, Montreal, Prov. of Quebec, Canada, H3S 2S9

[21] Appl. No.: 248,341

[22] Filed: Mar. 27, 1981

[51] Int. Cl.³ .............................................. G05D 11/00
[52] U.S. Cl. ..................................................... 137/100
[58] Field of Search ........................ 251/61, 325, 205; 137/98, 100, 625.38

[56] References Cited

U.S. PATENT DOCUMENTS

| | | | |
|---|---|---|---|
| 1,902,336 | 3/1933 | Murray | 137/625.38 |
| 2,832,573 | 4/1958 | Rees | 251/61 |
| 3,083,942 | 4/1963 | Hirst et al. | 251/61 |
| 3,324,872 | 6/1967 | Cloud | |
| 3,724,480 | 4/1973 | Povalski et al. | 137/98 |
| 3,896,836 | 7/1975 | Labarre | |
| 3,921,659 | 11/1975 | Rudewick | 137/98 |
| 4,094,333 | 6/1978 | Petursson | 137/100 |

FOREIGN PATENT DOCUMENTS 820069 8/1969 Canada.
954768 9/1974 Canada.
1029278 4/1978 Canada.

Primary Examiner—H. Jay Spiegel

[57] ABSTRACT

A device for balancing the pressures of two different feeds of fluid is disclosed, consisting of a housing and two longitudinally extending casing portions on each side of the housing and communicating therewith. The housing contains a longitudinally displaceable flexible but non-elastic diaphragm. An actuating rod is rigidly secured to the diaphragm and extends into both casing portions. Each of the latter contains a slide valve secured to the outer ends of the actuating rod. Each slide valve is a hollow rigid tube having a slit in its surface. Each casing portion is provided with an outlet opening and an inlet opening. The fluids enter the inlet openings, flow through the slits in the slide valves and act on the diaphragm through the casing portions before flowing out through the outlet openings at balanced pressures.

4 Claims, 6 Drawing Figures

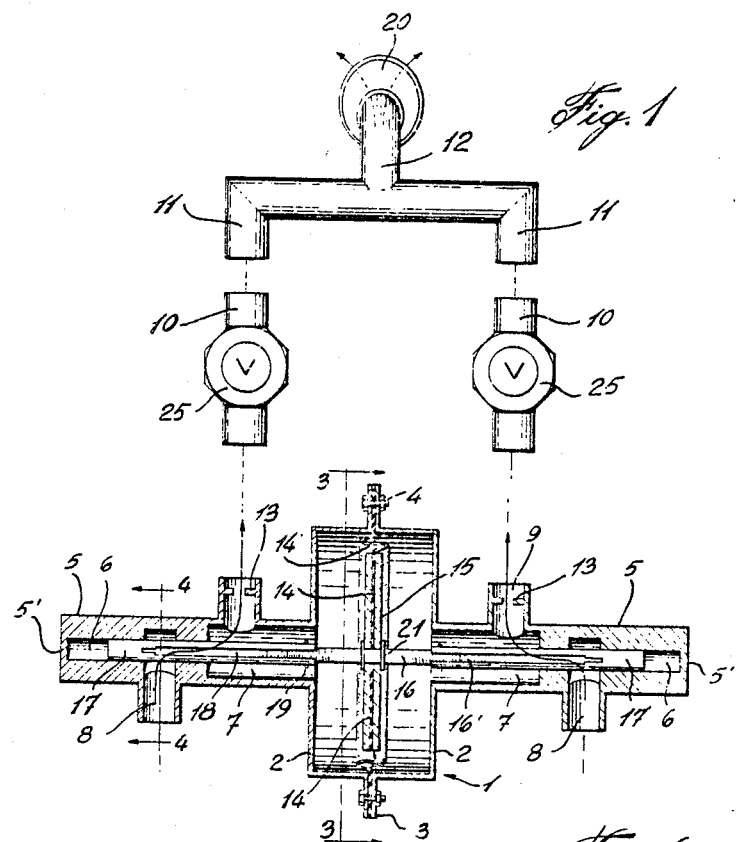
Fig. 1
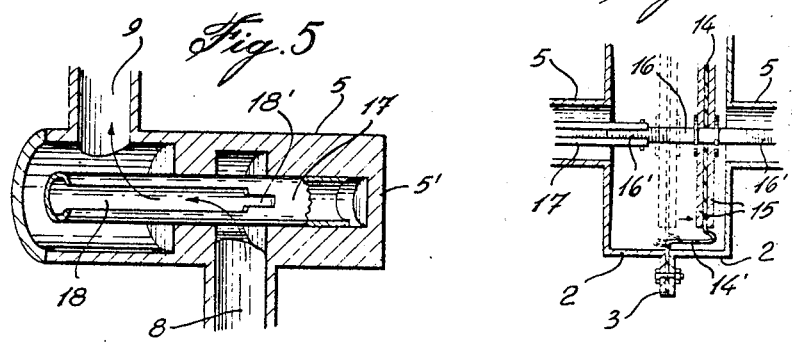
Fig. 5
Fig. 6

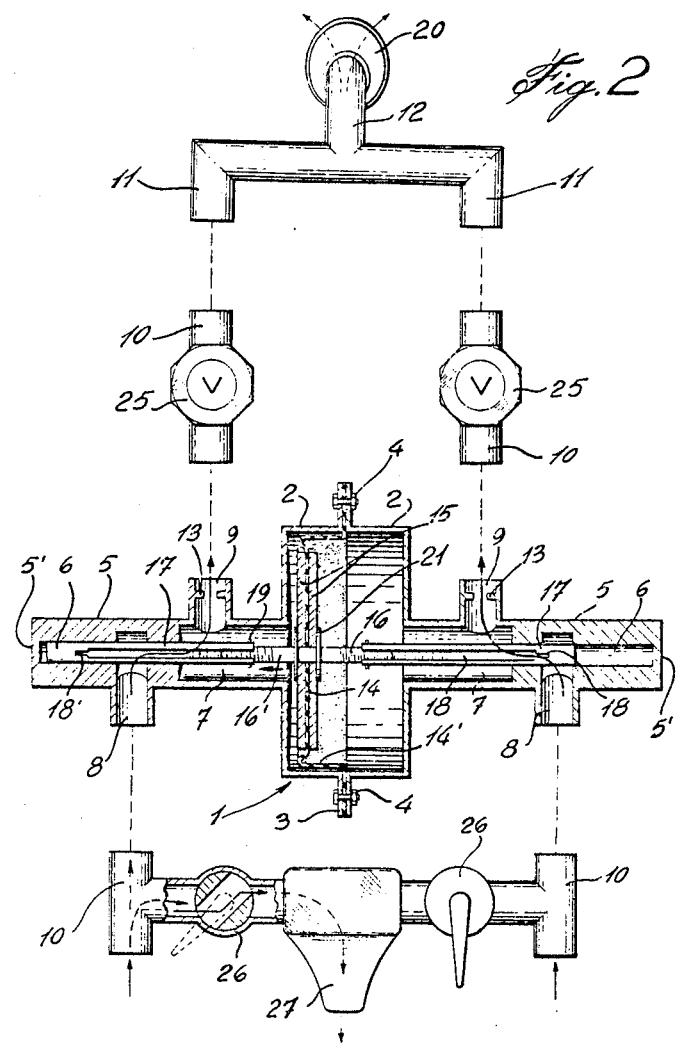
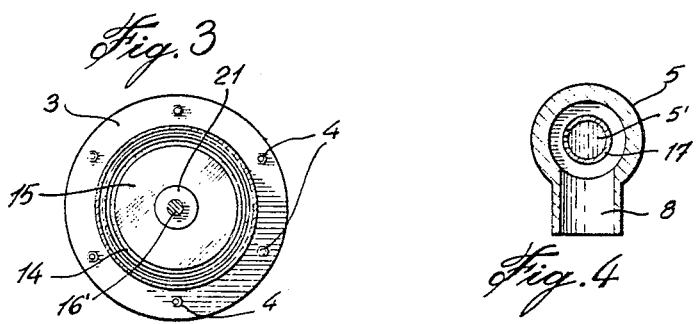

FLUID PRESSURE BALANCING AND MIXING VALVE

FIELD OF THE INVENTION

The present invention relates to devices designed to mix and pressure-balance two separate streams of fluid such as water, more specifically to an improved device for accomplishing these functions which is very reliable and simple.

BACKGROUND OF THE INVENTION

In many industrial and domestic applications, it is very desirable to have a means to balance the pressure of two different feeds of fluid which are to be mixed. For example, the fluids may be hot and cold water mixing together and flowing to a shower head in a home or a hotel. In such a situation, it is impossible to control the input pressure of the hot and cold water supply and the pressure-fluctuation of the input is subject to a variety of factors resulting in a sudden or gradual change in water temperature at the shower head.

Many devices have been developed in the prior art to pressure-balance and mix two different fluids but all of these devices have in common the significant disadvantage of being relatively complex and needing a plurality of parts both moving and fixed.

OBJECTS OF THE INVENTION

Accordingly, it is an important object of the present invention to provide a fluid-pressure balancing valve which reacts instantly to any pressure differential between two feeds of fluid and which is very simple in design, having very few parts.

It is another object of the present invention to provide a fluid-pressure balancing valve which incorporates a flexible diaphragm in a novel way.

SUMMARY OF THE INVENTION

The above and other corollary objects and advantages of the present invention are realized according to a preferred embodiment comprising a longitudinally extending casing having two closed opposite ends.

The central portion of the casing is larger and forms a pressure-balancing housing consisting of a pair of hollow cylindrically-shaped portions, each inwardly open, and each having a central peripheral flange. Means are provided to detachably secure these flanges together.

This pressure-balancing housing contains a centrally secured flexible but non-elastic diaphragm dividing the housing into noncommunicative left and right halves. The diagragm is sandwiched between a pair of flat circular plates which are adapted to move in either longitudinal direction. The marginal portion of the diaphragm which freely extends between the housing and the flat circular plates is wide enough to permit free movement of the plates to either one of their two limit positions.

The left and right portions of the casing are identical, each having a relatively small-diameter bore. The latter extends from the outer end of each portion of the casing inwardly, then opening into a large-diameter bore which communicates with the pressure-balancing housing.

Each portion of the casing is provided with an inlet opening which communicates with the small-diameter bore. These two inlet openings are for the two fluids which are to be pressure-balanced in the device of the present invention.

Two outlet openings are also provided one in each portion of the casing, each of these outlets communicating with the large diameter bore. The fluids, after having been pressure-balanced, pass through the outlets into a common conduit, leading, for example, to a shower head, or to any other mixed fluid application.

An actuating rod is rigidly secured to the center of the flat circular plates and extends into both portions of the casing. It is thus adapted to slide in either longitudinal direction with the action of the diaphragm and its associated plates.

A slide valve consisting of a hollow rigid tube is secured to each end of the actuating rod and is adapted to slide in both the small-diameter and large diameter bore of each portion of the casing. Means are preferably provided to adjust the length of each slide valve in each portion of the casing.

Each slide valve has at least one slit in its surface to enable the fluids to pass through the valve from the inlet to the outlet and also into the casing and thus act on the diaphragm. The outermost portion of the slit in each slide valve is preferably much narrower to effectively prevent water hammer when either valve closes when the pressure in either supply pipe changes abruptly.

The device balances the pressure of the two feeds of fluid in the following manner: if the pressure in one of the supply lines increases, the flow of fluid through the corresponding inlet opening will also increase since the rate of flow is directly proportional to the pressure in the supply line. The fluid will, therefore, rush into the inlet opening and through the slit in the slide valve, then into the large-diameter bore and on into the pressure-balancing housing where it will act on the flat circular plates. The latter will thus be pushed by the increased pressure towards the opposite side of the housing resulting in the closing movement of the above noted slide valve. The slide valve in the other portion of the casing will therefore effect opening movement and so admit more fluid through the other inlet opening.

Conversely, if there is a decrease in pressure in one of the supply lines, there will be an equal decrease in pressure against the circular plates on that side of the housing moving the adjacent slide valve outwardly to admit more fluid on that side of the casing.

It is to be noted that the circular plates will react instantly to any pressure differential between the two inlet openings and provide a constantly balanced mix of the two fluids since they are not biased by the diaphragm.

The device is therefore highly sensitive to pressure variation.

The two outlet openings are preferably each provided with a choke means to maintain pressure in the housing and casing portions.

The above will be more clearly understood by having referral to the preferred embodiment of the invention, illustrated by way of the accompanying drawings, in which:

BRIEF DESCRIPTION OF THE DRAWINGS

FIG. 1 is a longitudinal section of the device showing the circular plates in central position, also showing operating valves and two outlet pipes merging into a mixing pipe and shower head;

FIG. 2 is a similar longitudinal section but with the circular plates in a limit position in the housing, also showing a standard bath faucet;

FIG. 3 is a cross-section taken along line 3—3 of FIG. 1;

FIG. 4 is a cross-section taken along line 4—4 of FIG. 1;

FIG. 5 is an enlarged longitudinal section of the right portion of the casing, with the slide valve partially broken away and wherein the arrows indicate the direction of fluid flow; and FIG. 6 is a partial longitudinal section of a portion of the housing showing the diaphragm and circular plates in a limit position, and, in dashed outline, the diaphragm and circular plates in a central position.

Like numerals refer to like elements throughout the drawings.

DETAILED DESCRIPTION OF THE INVENTION

The pressure balancing device 1 of the present invention comprises a pressure-balancing housing composed of two identical, hollow and inwardly open halves 2. Each half 2 has a radially projecting flange 3 at its inner edge; the flanges are adapted to be detachably secured together by bolts 4 or any other suitable means.

Each half 2 of the pressure-balancing housing has, integrally secured to itself, a longitudinally, outwardly extending casing portion 5.

Each of the latter has a smaller diameter bore 6 closed at the outer end 5' of casing portion 5, and a larger diameter bore 7 located intermediate and communicating with the pressure-balancing housing and with the smaller diameter bore 6.

Each casing portion 5 is provided with an inlet opening 8 which communicates with the adjacent bore 5. The former opens into bore 5 at a right angle for a purpose explained below.

Each casing portion 5 is also provided with an outlet opening 9 communicating with bore 7.

The inlet openings 8 are connected to the supply pipes 10 of the two fluids which are to be mixed.

The outlet openings 9 are in turn converted to outlet pipes 11 which merge into a common mix pipe 12 located downstream of the device. In the drawings, the pipes are conduits for hot and cold water respectively, leading to the shower head 20 shown in FIGS. 1 and 2 although it is to be understood that any other two fluids could be pressure-balanced and mixed by the device. Each outlet opening 9 is provided with a choke 13 to maintain a sufficient amount of fluid pressure in the casing portions and the housing.

The pressure-balancing housing includes within its confines a flexible but non-elastic diaphragm 14. As shown clearly in FIGS. 1 and 2, the diaphragm 14 divides the housing into non-communicative left and right sides and is held in place between the flanges 3. The diaphragm 14 is also sandwiched between a pair of flat circular plates 15 in the housing. The free marginal portion 14' of diaphragm 14, extending between plates 15 and housing halves 2, is wide enough to permit free movement of plates 15 to either one of their two limit positions as shown in FIGS. 2 and 6.

An actuating rod 16 extends longitudinally into each bore 7 and is rigidly secured through the center of diaphragm 14 and the circular plates 15. The outer portions 16' of rod 16 are threaded. Rod 16 is secured in place by means of small fixing washers 21 on both outer sides of flat plates 15.

Each casing portion 5 is provided with a slide valve 17 having the form of a hollow and rigid tube open at both ends. The latter has a sliding fit with bore 6 and has at least one slit 18 along the major portion of its length. This slit 18 narrows appreciably at the outer end 18' of slide valves 17. In any position of plates 15, each slit 18,18' is long enough to bridge inlet and outlet openings 8 and 9.

The inner end portion of each slide valve 17 has complementary internal threading adapted to engage the opposite ends of actuating rod 16. Thus, the longitudinal position of each slide valve 17 relative to inlet 8 may be adjusted. A detachable attaching means is provided to secure each slide valve 17 in adjusted position to the respective ends of actuating rod 16 consisting of a cotter pin 19 or any other appropriate means.

Referring now to FIG. 5, the arrows therein indicate the flow of fluid on the right side of the device, flowing in from supply inlet opening 8, through the slit 18 and out through outlet 9. The fluid also flows into the left casing portion 5 where its pressure acts on the plates 15. The inlet opening 8 is at right angles to the slide valve 17 in order to prevent the fluid dynamic pressure from affecting the axial position of plates 15.

In FIGS. 1 and 2, the device is shown in one of several possible uses, that of pressure-balancing hot and cold water flowing to a shower head. Two conventional flow adjusting valves 25 are shown in the figures. These valves 25 are located downstream of the device 1.

FIG. 2 further illustrates a pair of hot and cold water taps 26 and a bath faucet 27 connected to the supply pipes although these features are not part of the invention.

The operation of the device is simple and obvious: taking FIG. 2 by way of example, the fluid (cold water) flowing into inlet opening 8 on the right side of casing portion 5 has a much higher pressure than that of the fluid (hot water) flowing into the left side of casing portion 5 since the plates 15 have been pushed to an extreme limit position on the left side of the housing. In this position, only a slight flow of cold water can pass through the narrow portion 18' of slit 18 while the slide valve 17 on the opposite side allows a maximum amount of hot water into the left casing portion 5. Thus, an excess of cold water is effectively prevented from reaching the shower head 20 by the device 1.

A surge of hot water pressure is depicted in FIG. 6 while FIG. 1 shows that the plates 15 and slide valves 17 are centered because the two inlet fluid pressures are equal. Because diaphragm does not bias plates 15, the latter are highly sensitive to pressure differential.

What I claim is:

1. A device for balancing the pressure of two different feeds of fluid comprising: a pressure-balancing housing formed of two hollow and inwardly open halves, means to detachably secure said halves together, each of said halves having, rigidly secured thereto, a longitudinal outwardly extending casing portion, both of the latter being aligned, each said casing portion having a smaller diameter bore closed at the outer end of said casing portion and a larger diameter bore located intermediate and communicating with said smaller diameter portion and said housing, all of said bores being in alignment, each said casing portion further having an inlet opening communicating with said smaller diameter bore and an outlet opening communicating with said larger diameter bore, both said inlet and outlet openings being substantially at right angles to said bores, said housing being provided with a centrally located flexible but non-elastic diaphragm dividing said housing into non-communicative left and right sides; the periphery of said diaphragm being secured between said halves, a rigid longitudinally oriented actuating rod extending through the center of said diaphragm and extending into each larger diameter bore substantially axially thereof and terminating short of the smaller diameter bore, a pair of rigid plates secured to said actuating rod, said diaphragm being sandwiched between said plates, a slide valve consisting of a hollow rigid tube open at both ends and slidably fitted in each said smaller diameter bore and having one end secured to the outer end of said actuating rod respectively, said plates movable between two limit positions in said housing, the marginal portion of said diaphragm extending between said two plates and said housing halves being wide enough to allow free movement of said plates between their two limit positions, each tube having a longitudinal slit in its surface registering with said inlet opening and registering with said larger diameter bore to allow flowing of fluid from said inlet to said outlet opening through said hollow tube, in all positions of said plates, only the static pressure of said fluid being exerted on said plates and diaphragm through said larger diameter bore.

2. A device as claimed in claim 1, wherein said slit of each said slide valve narrows appreciably at its outer end to effectively prevent water hammer.

3. A device as claimed in claim 1, further including adjustable securing means between said actuating rod and each tube to secure each slide valve in adjusted position longitudinally of said actuating rod.

4. A device as claimed in claim 1, further including choke means in said outlet openings.

* * * * *